March 31, 1942.  F. W. LEE  2,277,707
ELECTRICAL IMPEDISIVITY OR RESISTIVITY MEASURING
Filed April 8, 1938

Frederick W. Lee,
Inventor,
by J. F. Motherhead
Attorney.

Patented Mar. 31, 1942

2,277,707

UNITED STATES PATENT OFFICE 2,277,707

ELECTRICAL IMPEDISIVITY OR RESISTIVITY MEASURING

Frederick W. Lee, Owings Mills, Md.

Refiled for abandoned application Serial No. 743,738, September 12, 1934. This application April 8, 1938, Serial No. 200,948

12 Claims. (Cl. 175—182)

(Granted under the act of March 3, 1883, as amended April 30, 1928; 370 O. G. 757)

The invention described herein may be manufactured and used by or for the Government of the United States without payment of any royalty thereon.

The present case is a refile of application Serial No. 743,738, filed September 12, 1934.

This invention relates to the art of electrical impedisivity or resistivity measuring and aims generally to improve the same. The invention is particularly but not exclusively adapted for use in geophysical surveying and is described hereinafter in connection with such use.

Among the objects of the invention, severally, are the provision of an improved method and means for measuring electrical resistivity; the provision of an improved method and means for measuring its alternating current equivalent, herein termed impedisivity; and the provision of novel steps and arrangements of parts in various subcombinations contributing to the more comprehensive aims above stated.

In the art of geophysical surveying, it is well known that by producing a current field in a medium, as the earth's crust for example, and taking measurements of current and potential at proper points of the medium, data may be obtained, from which, after measurement of the geometrical constants of the medium, its electrical resistivity may be calculated. As set forth in my prior Patent No. 1,951,760, granted March 20, 1934, the formulae for such calculations involve the geometric spacings of the electrodes and the current and potential observations.

The present invention, in its more comprehensive aspects, as applied to geophysical surveying, greatly simplifies the procedure in making such surveys, enables direct measurement of the apparent earth resistivity and dielectric constants of the ground without elaborate computations which have heretofore been necessary, and saves frequently as much as 50% of the field man's time, as well as eliminating the possibilities of error incident to the previously required computations.

Figure 1:
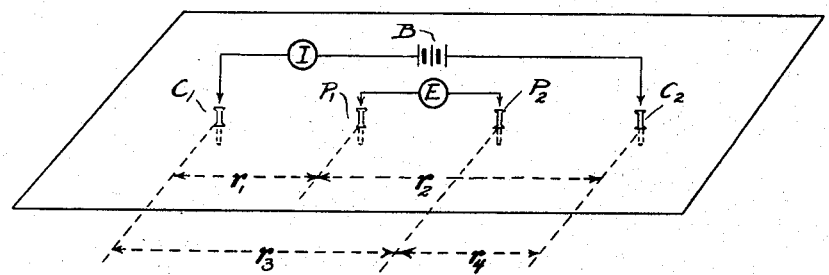
Figure 2:
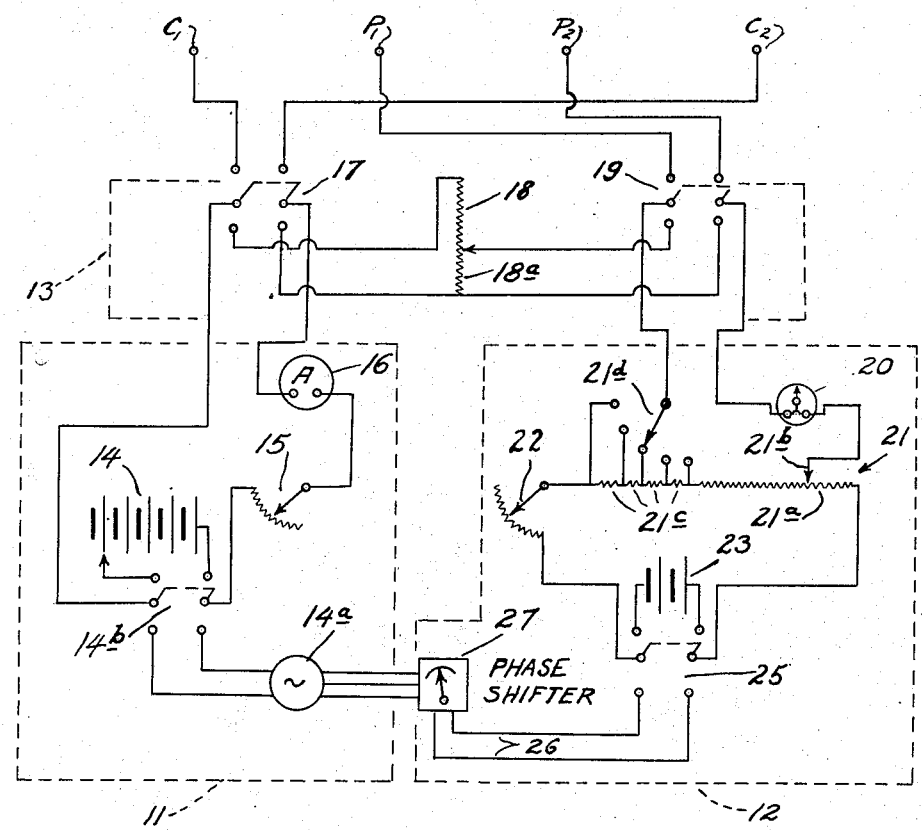

In the accompanying drawing forming a part of the present specifications,

Figure 1 is a diagrammatic representation in perspective of an arrangement of electrodes for measuring ground resistivity, and Figure 2 shows diagrammatically the method and means of this invention adapted for use in the arrangement of Figure 1.

In the simple arrangement for measuring ground resistivity shown in Figure 1, the battery B supplies current to the current electrodes $C_1$ and $C_2$, the total current flowing being indicated by current meter I. Spaced between the current electrodes $C_1$ and $C_2$, and in the form shown along a straight line extending between them, are potential ground contacts $P_1$ and $P_2$, and the difference in ground potential at these electrodes may be indicated by a voltmeter E.

As shown in Figure 1, the potential electrode $P_1$ is spaced from the respective current electrodes $C_1$ and $C_2$, by distances $r_1$ and $r_2$; and the potential electrode $P_2$ is spaced from the current electrodes $C_1$ and $C_2$ by the distances $r_3$ and $r_4$, respectively.

*Principle of operation and general method*

The mathematical relations of current and potential in Figure 1 may thus be represented by the following equation in which rho ($\rho$) designates resistivity:

$$E = \frac{I\rho}{2\pi}\left(\frac{1}{r_1} - \frac{1}{r_2} - \frac{1}{r_3} + \frac{1}{r_4}\right) \quad \text{(Eq. 1)}$$

Now if the total distance between the current electrodes $C_1$ and $C_2$ be designated $d$, it is clear that $r_1$, $r_2$, $r_3$, and $r_4$, may be expressed as percentages of $d$. Using $K_1$ as the per cent of $d$ lying between $C_1$ and $P_1$ and $K_2$ as the per cent of $d$ lying between $C_1$ and $P_2$, then $r_1 = K_1 d$ and $r_2 = (1-K_1)d$ while
$r_3 = K_2 d$ and $r_4 = (1-K_2)d$ Substituting these values in Equation 1 and reducing, yields:

$$E = \frac{I\rho}{2\pi d}\left[\frac{1-2K_1}{K_1-K_1^2} + \frac{2K_2-1}{K_2-K_2^2}\right] \quad \text{(Eq. 2)}$$

In some geophysical measurements $P_1$ and $P_2$ may not lie on the straight line joining the current electrodes $C_1$ and $C_2$. Under these circumstances $K_1$ and $K_2$ become complex fractions such as $0.5 + i.4$, in which $i$ is the square root of minus one. In such instances it will be more convenient, and will simplify the field technique, to employ the system of my copending application Serial No. 200,947, filed April 8, 1938, entitled "Geophysical surveying."

However, it will be seen that whether $K_1$ and $K_2$ are real or complex for a given configuration of applied electrodes, the entire bracketed portion of Equation 2 is a constant, and that if this bracketed portion be represented by $K$ the equation reduces to:

$$E = \left[\frac{I\rho}{2\pi d}\right] K \quad \text{(Eq. 3)}$$

By solving this equation for resistivity $$\rho = \frac{2\pi}{K} \cdot E \cdot \frac{d}{I} \quad \text{(Eq. 4)}$$

Now the present invention contemplates as a preferable condition that the factor $$\frac{d}{I}$$

be kept constant. This may be accomplished by changing the value of the current I for changes in the ground spacing d, in constant ratio.

In addition, the present invention contemplates as a preferred condition that this ratio of $$\frac{d}{I}$$

be made equal to K divided by $2\pi$. This may be accomplished by proper proportioning of the scale of the current meter.

Under these preferred conditions it is apparent that Equation 4 will reduce to $$\rho = E \quad \text{(Eq. 5)}$$

and that the voltmeter or potentiometer E may thus, by this invention, be made to indicate directly the electrical resistivity being measured. In embodying this method in the meter of my invention special shunts are employed, together with a means for adjusting the current to specified values for different selected distances d. For simplicity the scale of d and I may be made the same or simple multiples or fractions of each other.

Even more flexible results may be obtained by my invention by assigning to the fraction $$\frac{d}{I}$$

a definite valve, say m. Under these conditions I may be measured in amperes as well as in terms of d in any system of units, either current or distances, and Equation 4 will become:

$$\rho = \frac{2\pi m}{K} E \quad \text{(Eq. 6)}$$

Now if E is the voltage applied to a voltmeter or potentiometer, and if, as contemplated by this invention, arrangements are made to enable adjustment of the scale reading (Es) with reference to the actual voltage E so that $$E = \frac{K}{2\pi m} \cdot E_s \quad \text{(Eq. 7)}$$

then, substituting in Equation 6, it will be found that under these conditions the resistivity may be directly read on the scale of the instrument, viz.:

$$\rho = E_s \quad \text{(Eq. 8)}$$

As exemplifying suitable arrangements which may be made to enable adjustment of the scale reading Es with reference to the actual voltage E the invention contemplates that multiplier resistances or a current shunt, as a part of a potentiometer drop wire, may be used, as hereinafter explained.

It is, of course, understood that adjustments are flexible enough to permit simple scale multiples or decimals for any range of observation.

Simplified species of method

Now, applying the general method above outlined to the simple case in which $r_2 = 2r_1$, and $r_3 = 2r_4$ (i. e. in which the distances $C_1P_1$; $P_1P_2$; $P_2C_2$ are all equal and on the same straight line), and assigning the value $a$ to the distance $r_1$, we find from Equation 1 that:

$$E = \frac{I\rho}{2\pi}\left(\frac{1}{a} - \frac{1}{2a} - \frac{1}{2a} + \frac{1}{a}\right) \quad \text{(Eq. 1a)}$$

which, reduced, and solved for the resistivity, yields:

$$\rho = \frac{2\pi E a}{I} \quad \text{(Eq. 4a)}$$

Now, if $a$ is measured in feet, E in millivolts, and I in milliamperes, and it is desired to determine resistivity in ohm-centimeters, bearing in mind that one foot equals 30.48 centimeters, and $2\pi$ equals 6.2838, for this equi-spaced electrode arrangement.

$$\rho = \frac{(6.2838)(30.48) E a}{I}$$

Whence $$\rho = 191 \frac{E a}{I}$$

Now, if value of I in milliampers be made equal to, or a simple multiple of, the value of $a$ in feet, as $a/1000$, then $$\rho = 191 E \quad \text{(Eq. 5a)}$$

Then if an adjustment of scale according to the method of this invention is made, so that for an actual input of 191 millivolts, the scale reading Es will be 100 units, then $$\rho = 100 E_s$$

For the purpose of explaining the fundamentals of the method of this invention, reference has been had above to operations in which a direct current field is applied to the material investigated. It will be apparent, however, from the following description that this direct current discussion exemplifies the method as performed with either direct or alternating current.

Illustrative simplified circuit

Referring now to the illustrative simplified circuit shown in Figure 2, it will be seen that either direct current or alternating current may be used, and that the preferred embodiment of the invention embodies electrical circuits adapted for the use of either.

Thus, the current circuit or unit 11, in the form shown, consists of a source of power, herein shown as either a battery 14 or alternating current source 14$^a$, which may be connected in the circuit by a suitable switch 14$^b$, herein a double-pole double throw switch, to enable the direct current or alternating current source to be selectively employed. The voltage of the source of power may be suitably controlled, as by adjusting the number of cells in the battery 14 or controlling the voltage of the generator 14$^a$. The circuit shown includes further illustrative means for controlling the amount of current flowing in the circuit, as the adjustable rheostat 15; and suitable means for determining the amount of current flowing therein, as the current meter or milliammeter 16.

The output of the current circuit 11, as shown, is preferably connected by means of a suitable switch 17, to be applied to the current electrodes $C_1$, $C_2$, Figure 2, which may be located as in Figure 1.

The resistivity or impedisivity measuring circuit 12, herein exemplified by a potentiometer circuit, is adapted to be connected to the potential electrodes $P_1P_2$ of a ground-configuration, as, for example, the ground configuration of Figure 1, preferably by means of a switch 19 of suitable form.

As is usual in the art of geophysical surveying, reversing switches (not shown) may be employed for interchanging the connections to $C_1C_2$ and for interchanging the connections to $P_1P_2$, to obtain the proper relative polarity or reverse the direction of measurement of resistivity, as desired.

The measuring circuit 12 comprises means for receiving the potential derived from the potential ground electrodes, and for directly reading the ground resistivity determining the same. In the preferred form, this direct reading means comprises a galvanometer or null current indicator 20, such as a sensitive galvanometer, which may be provided with suitable means, such as a copper oxide rectifier, for operating upon alternating current; a calibrated potentiometer 21 and a potentiometer current source comprising a potentiometer current controller, as the adjustable rheostat 22; and a source of direct or alternating current, herein the battery 23 or alternating current input leads 26. Where it is desired to facilitate selective use of either direct or alternating current, as above mentioned, a suitable switch, as a double pole double-throw switch 25, is arranged to connect either type of potentiometer current source (i. e. 23 or 26) into the circuit.

The potentiometer generally indicated by 21, in the preferred form, comprises a calibrated slide wire $21^a$, with cooperating slide $21^b$, and calibrated resistances $21^c$, each having, in effect, a resistance equal to that of the slide wire. The contact switch $21^d$ thus permits raising the voltage in units of 100, and the slide wire $21^a$ subdivides the 100 units on it into single units. The galvanometer 20 indicates when the applied and adjusted voltages between switch $21^d$ and $21^b$ are equal.

In the preferred embodiment of my invention, all resistance circuits employed are to be essentially free of inductance or capacity so that they may operate without error on either direct or alternating current.

In order to calibrate or fix the scale ratio of the potentiometer 21, suitable provisions are contemplated. In simplest form this provision may be made by employing a standard potentiometer current source, as a standard cell at 23, for example. Under these conditions, the adjustment of the current in the potential current circuit 21 must use the relation of Equation 7; with E as the standard cell voltage.

However, as geophysical surveying is frequently conducted under extreme weather conditions in which a standard cell is apt to fail, the invention contemplates as preferable, an improved calibrating or scale adjusting means exemplified by circuit 13, Figure 2.

This calibrating, conditioning, or scale adjusting circuit, in the form shown, consists of a high resistance 18 connected in series with a low resistance $18^a$. These resistances, for convenience may have values, of say 1,000 ohms and 10 ohms, respectively.

Suitable provision is made for connecting the current circuit 11 to the measuring circuit 12 by way of these resistances 18, $18^a$, in the form shown in Figure 2, by employing the double-pole double-throw switch 17 to connect the resistors 18, $18^a$ in series with the output of current circuit 11, in lieu of the current electrodes $C_1$, $C_2$; and by employing the double-pole double-throw switch 19 to connect the resistance $18^a$ alone in series with the input to measuring-circuit 12, in lieu of the potential electrodes $P_1$, $P_2$.

Now, referring to Equation 7, knowing the current flowing in circuit 11 (by reading on ammeter 16 the current as adjusted by rheostat 15), and knowing the value of resistance $18^a$, the actual voltage E applied to the input of the measuring circuit 12 is easily determined. Then with the current I (indicated at 16) adjusted in predetermined ratio to the distance $d$ between the electrodes $C_1$ and $C_2$ of the configuration to be used, and with a knowledge of the constant K of such configuration, the proper adjustment of the potentiometer current (by means of rheostat 22) may be easily determined.

While this may appear involved, the operation is really quite simple, as shown, for example, by the procedure when using the configuration described above under the caption "Simplified species of method."

With this configuration, from Equation 5a, $$\rho = 191E$$

If a ground voltage of, say, 100 millivolts were measured under this condition, the electrical resistivity would equal 191 times 100, or 19,100 ohm centimeters. The potentiometer scale 21 of the measuring circuit, therefore, with this ground configuration, should read not 100 millivolts, but 191 millivolts.

Now, with switches 17 and 19 in the down position (Figure 2) and rheostat 15 adjusted so that ammeter 16 shows a current of 10 milliamperes, and with a 10 ohm resistance at $18^a$, it will be apparent that the voltage applied through switch 19 to the input of the potentiometer circuit 12 would be 100 millivolts. The slide wire potentiometer 21 is now set, not for 100, but for 191 (as by including one section $21^c$ and 91 units of $21^a$ between the input members $21^b$ and $21^d$). Then by adjusting rheostat 22 to obtain a null reading of galvanometer 20, the measuring circuit is conditioned for direct reading of resistivity. That is, the instrument will now multiply any ground voltage applied to it by 1.91, and will give a direct reading of 382 units of resistivity between $21^d$ and $21^b$, for a null on 20 when 200 millivolts are applied through switch 19; 95½ units of resistivity when 50 millivolts are thus applied, etc.

The instrument being thus adjusted, switches 17 and 19 are thrown to surveying position, and in accordance with the premise for Equation 5a, the rheostat 15 is adjusted to obtain a current reading on milliammeter 16 corresponding to the distance between electrodes $C_1$ and $C_2$ (i. e. 50 milliamperes for 50 feet). With this applied current, the members $21^d$ and $21^b$ are adjusted for a null on galvanometer 20, and the reading of the potentiometer between these members at such balanced condition, will be the apparent earth resistivity. Sometimes, due to the character of the ground, it may be more convenient to adjust the current (I, on milliammeter 16) to 5 milliamperes instead of 50 (or similar ratio for different distances $d$) in which case the potentiometer reading from $21^d$ to $21^b$ would be multiplied by 10.

Generalization

The same general principles are employed and the same general method is followed, in operating with alternating current.

Thus, to condition or calibrate the scale, the reference scale length of the potentiometer is selected to correspond with the reference input voltage multiplied by the proper constant representing the relation between impedisivity and input voltage (i. e., $\rho$ in Equations 5 and 5a representing impedisivity); the input voltage is applied to this reference scale length, and the local potentiometer current is adjusted to give the same potential drop across the said scale length, so as to produce a null in the input circuit galvanometer.

For use with either alternating current or direct current, the milliammeter 19 will be of the well known A. C.—D. C. type and the galvanometer 20 may be either of the electrodynanometer type or a d'Arsenval type of galvanometer provided with a suitable rectifier, as a copper oxide rectifier, for use with alternating current.

Now, if alternating current is to be applied to the ground, the alternating source will be applied across the (non-inductive) resistors 18, 18a as before, and the root mean square current, times the value of resistance 18a will constitute the indicated input voltage.

The potentiometer local alternating current will then be adjusted by rheostat 22 and phase shifter 21 to bring the instantaneous input and local voltages applied to the galvanometer 20 into such relation as to obtain a null.

Irrespective of whether the galvanometer 20 is of the electrodynanometer type, or of the d'Arsenval type provided with a rectifier, the condition of null indication will be obtained only when the instantaneous input and local voltages are the same, i. e., when they have the same indicated value and phase.

Thus, the balancing of the chosen potentiometer scale against the reference potential takes care of all extraneous factors, as in the case of direct current operation, and when the indicated alternating current applied to the ground is properly related to the spacing of the current electrodes, as in the direct current case, the potentiometer reading for balance will directly indicate the apparent impedisivity amplitude and the phase shifter the angle associated with this amplitude.

It will be appreciated that in the alternating current case, the impedisivity has the form of a complex operator which embodies both magnitude and time phase and in which the complex component owes its origin to the permeability and dielectric constant of the medium under observation.

This particular complex value must not be confused with the complex value due to the fact that the resistivity in the medium is directional, as mentioned in the above discussion of the configuration of ground electrodes. It should be borne in mind that a similar variation also exists for the dielectric property and permeability, so that the complex alternating component of impedisivity also has a complex space component. For this reason, where the imaginary or transverse resistivity or impedisivity is not to be considered, the measurements will preferably be made in a direct line between $C_1$ and $C_2$ (see for example, my prior Patent No. 1,951,760, granted March 20, 1934), and where the non-isotropic character of the medium is to be determined, the measurements will preferably be made at right angles through the mid-point of that line, to eliminate the effect of the real component (see my copending application Serial No. 333,752 filed May 7, 1940, for example).

While the method and means herein described are especially adapted for making measurements of the ground constants without the laborious calculations which usually accompany such observations, it is understood that they may be used in the solution of mathematical relations which have variable parameters similar to those discussed in the equations herein.

In addition the present invention enables facile classification of materials of which the medium may consist, for example, in the case of clay, the direct current resistivity has a definite value, and the alternating current impedisivity has a relatively low complex or phase shift component at various frequencies. By contrast, in the case of quartz, while a high direct current resistivity is indicated, the alternating current impedisivity has a relatively higher complex or phase shift component. Thus, the method of this invention contemplates comparative readings of impedisivity under varying types of currents, as direct current, pulsating current, and alternating currents of different frequencies; and the apparatus, in its more comprehensive aspects, contemplates an instrumental combination capable of making measurements of more than one type.

In this connection the alternator 14a, Fig. 2, may be of the type adjustable to supply more than one given frequency or kind of current. It will further be seen that inasmuch as it is preferred, in practicing the present invention, to maintain a definite value of $l/d$ (see introduction to Equation 6), more uniform comparative results between different surveys may be attained, as the variable factors introduced because ground resistivity usually does not exactly follow Ohm's law even for direct currents (see Patent No. 1,951,760), are minimized.

Reference is made to my copending application entitled "Geophysical surveying," executed March 17, 1938, Ser. No. 200,947, filed April 8, 1938, for supplemental and comparative purposes.

From the foregoing description of preferred embodiments of my invention it will be apparent that except where expressly used only with alternating current the term impedisivity is generic to either direct current resistivity or to the alternating current equivalent thereof, and the term is correspondingly employed in the following claims.

I claim:

1. A method of measuring electrical impedisivity of a medium comprising the steps of laying out a configuration for applying, from a source, electrical energy to the medium and for picking up potentials existing in the energy field thus created in the medium, said configuration being one for which the relation is known between the geometrical constants of the configuration, the electrical energy applied thereto, the potentials picked-up therefrom, and the unknown apparent impedisivity of the medium; supplying electrical energy to said configuration of a value in predetermined ratio to the size of said configuration; electrically proportioning the scale of a potential balancer to multiply potential indications by a factor rendering the potential balancer scale direct reading in magnitude of impedisivity for said known configuration with energy applied in accordance with said ratio; and balancing picked up potentials with the so adjusted potential balancer; whereby the apparent impedisivities of the medium embraced by the configuration are readable directly on the potential balancer scale.

2. A method according to claim 1 in which a common alternating current source is employed for supplying electrical energy to the configuration and to proportion the scale of the potential balancer; and in which the method further comprises the steps of changing the relative phase of the current supplied to the configuration and to the potential balancer to bring the alternating potentials applied to the balancer in cancelling phase, and measuring the phase change introduced to produce such phasing as a direct measure of the phase change component of impedisivity of the medium embraced by the configuration.

3. A method of measuring electrical impedisivity of a medium comprising the steps of: laying out a configuration of electrodes comprising current electrodes for applying, from a source, electrical energy to the medium, and potential electrodes for picking up potentials existing in the energy field thus created in the medium, said configuration of electrodes being one for which the relation is known between the spacings of the electrodes, the electrical energy applied to the current electrodes, the potentials picked up at the potential electrodes, and the unknown apparent impedisivity of the medium; supplying electric current to said current electrodes in predetermined ratio to the electrode spacings; electrically proportioning the scale of a potential balancer to multiply potential indications by a factor rendering the potential balancer scale direct reading in magnitude of impedisivity of the medium for said known configuration energized in accordance with said ratio; and measuring potentials picked up at said potential electrodes with the so adjusted potential balancer: whereby the magnitudes of the apparent impedisivities of the medium embraced by the configuration are directly indicated by the potential balancer scale.

4. A method of measuring alternating current impedisivity comprising the steps of: laying out a configuration for applying from a source an alternating current to a medium and for picking up potentials existing in the alternating current field in the medium; said configuration being one for which the relation is known between the geometrical constants of the configuration, the alternating current applied thereto, the potentials picked up therefrom, and the unknown apparent impedisivity of the medium; selecting a definite ratio for the value of current applied and the spacing of the points of current application in the configuration; proportioning the scale of a potential balancer to multiply alternating current potential indications by the proper factor to render the potentiometer scale thereof direct reading for the magnitude of impedisivity when the said definite ratio exists; supplying alternating current to said potential balancer from the same source from which current is applied to said medium; applying the potentials picked up from the configuration to various numbers of units of the potentiometer scale of the potential balancer and simultaneously adjusting the phase of the potentiometer current until balance of the potential balancer is attained; and reading the impedisivity magnitude and phase shift from the potentiometer and phase shifter, respectively, of the potential balancer.

5. In a system for measuring impedisivities, of the type employing a configuration for applying, from a source, electrical energy to a medium, and for receiving for measurement potentials produced in the resulting electrical field in the medium: in combination; a current circuit comprising at least one source of current, a current adjusting device, and a current measuring device; a potential balancing circuit comprising a voltage divider, at least one source of voltage therefor, means for adjusting the voltage applied to said voltage divider to vary the voltage drop per scale unit thereof, and a potential circuit including a galvanometer and embracing means for including in circuit therewith a variable number of scale units of said potential divider; a calibrating circuit connectable to derive a known potential from said current circuit and connectable to apply said known potential to said potential circuit to enable adjustment of the voltage drop of said potential divider to render the potential scale thereof fixedly related to impedisivity for a known geometric configuration supplied with current from said current circuit in known ratio to the size of the configuration; means for connecting said current circuit to the energy applying connections of the configuration; and means for connecting said potential circuit to the potential receiving connections of the configuration; substantially as and for the purpose described.

6. A system according to claim 5 in which said source of current and said source of voltage are separate D. C. sources.

7. A system according to claim 5 in which said source of current and said source of voltage are a common A. C. source provided with a phase shifter to shift the relative phase of voltages applied to said voltage divider for eliminating all current flow in said potential circuit.

8. A system according to claim 5 in which said source of current and said source of voltage are a common source provided with means for eliminating all current flow in said potential circuit.

9. In combination; a pair of current electrodes adapted to be electrically connected, in mutually spaced relation, with an earth volume; a pair of potential electrodes adapted to be electrically connected, in mutually spaced relation, with a portion of the earth volume within the zone of influence of said current electrodes; a calibrating circuit (13) comprising a voltage drop resistor, current input terminals connected thereto, and potential output terminals connected to pick up at least a portion of the voltage drop across said resistor; a current circuit (11) selectably connectable to the current electrodes and to the current input terminals of said calibrating circuit, said current circuit comprising at least one source of current, a rheostat and an ammeter; a potential balancer circuit (12) comprising a variable resistance, at least one source of potential, and means for impressing said source of potential across said variable resistance to produce a voltage drop per unit of said resistance controllable by varying the said resistance, said potential balancer circuit further comprising a galvanometer circuit including means for embracing in circuit a continuously variable portion of said variable resistance; said galvanometer circuit being selectably connectable to said potential electrodes and to the potential output terminals of said calibrating circuit; substantially as and for the purposes described.

10. A combination according to claim 9, in which a current supplied by said source of current and a potential supplied by said source of potential are identically alternating in character, and in which the combination further comprises means for shifting the relative phase of said current and said potential; whereby said source of potential and the calibrating and potential electrode potentials selectably connectable to said galvanometer circuit may be relatively phased.

11. In combination, two spaced current electrodes electrically connected to an earth volume, a current circuit for passing electrical current through said current electrodes and volume, said current circuit including means for adjusting the value of the current to control the over-all electrical field created in said volume, two spaced potential electrodes electrically connected to said earth volume within the area of said electrical field, a voltage divider connectable to said potential electrodes and calibrated to read directly in terms of impedisivity of the earth volume between said potential electrodes for a predetermined arrangement of electrodes and a predetermined ratio between the current of said current circuit and the spacing of said current electrodes, and said current circuit comprising indicator means for facilitating adjustment of said current-adjusting means to produce the said predetermined ratio, substantially and as for the purposes described.

12. A combination according to claim 11, in which means supplying alternating current energy identical in character energize said current circuit and voltage divider, and in which the combination further comprises means for shifting the relative phase of said energizations.

FREDERICK W. LEE.